United States Patent
Arimura

(10) Patent No.: US 8,034,513 B2
(45) Date of Patent: Oct. 11, 2011

(54) DIRECT-METHANOL FUEL CELL

(75) Inventor: Tomoaki Arimura, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/850,879

(22) Filed: Aug. 5, 2010

(65) Prior Publication Data

US 2011/0117476 A1    May 19, 2011

(30) Foreign Application Priority Data

Nov. 16, 2009    (JP) .................. 2009-261261

(51) Int. Cl.
    *H01M 4/92* (2006.01)
(52) U.S. Cl. ................. 429/524; 429/523; 429/527
(58) Field of Classification Search .............. 429/523, 429/524, 527
    See application file for complete search history.

(56) References Cited

U.S. PATENT DOCUMENTS

2009/0130515 A1    5/2009    Son et al.

FOREIGN PATENT DOCUMENTS

| JP | 2004-087426 | 3/2004 |
|----|-------------|--------|
| JP | 2004-207228 | 7/2004 |
| JP | 2006-147345 | 6/2006 |
| JP | 2006-156013 | 6/2006 |
| JP | 2008-123985 | 5/2008 |
| JP | 2009-054533 | 3/2009 |

OTHER PUBLICATIONS

Japanese Patent Application No. 2009-261261; Notification of Reason for Refusal; Mailed Nov. 9, 2010 (English Translation).

*Primary Examiner* — Jane Rhee
(74) *Attorney, Agent, or Firm* — Blakely, Sokoloff, Taylor & Zafman LLP

(57) ABSTRACT

According to one embodiment, a direct-methanol fuel cell includes an anode which includes a current collector and a first catalytic layer formed on the current collector and into which an aqueous methanol solution is introduced, a cathode which includes a current collector and a second catalytic layer formed on the current collector and into which an oxidizer is introduced and an electrolyte membrane interposed between the anode and the cathode. The second catalytic layer includes a catalyst, a perfluoroalkylsulfonic acid polymer, and a ternary metal-containing copolymer. The ternary metal-containing copolymer includes a first vinyl monomer containing an organic metal complex of Pt, a second vinyl monomer containing an organic metal complex of M1, where M1 is a metal selected from Sn, Zn, Ni, Fe, Co, Al and Cu and a third vinyl monomer containing an organic metal complex in which M2 is ionically bonded, where M2 is Eu or La.

2 Claims, 4 Drawing Sheets

DIRECT-METHANOL FUEL CELL

CROSS-REFERENCE TO RELATED APPLICATIONS

This application is based upon and claims the benefit of priority from Japanese Patent Application No. 2009-261261, filed Nov. 16, 2009; the entire contents of which are incorporated herein by reference.

FIELD

Embodiments described herein relate to a direct-methanol fuel cell.

BACKGROUND

A direct-methanol fuel cell has a cell structure provided with an anode which comprises a current collector and a catalytic layer formed on this current collector and into which an aqueous methanol ($CH_3OH$) solution is introduced as a fuel, a cathode which comprises a current collector and a catalytic layer formed on this current collector and into which an oxidizer is introduced and a proton conductive membrane interposed between these anode and cathode in such a manner that it is in contact with each of these catalytic layers. Each catalytic layer is formed of a mixture of a catalyst and Nafion™ (manufactured by DuPont), which is a perfluoroalkylsulfonic acid polymer. The Nafion™ in each catalytic layer is superior in chemical stability and also serves to support the catalyst. Incidentally, Nafion™ is also used as the structural resin of the proton conductive membrane which is an electrolyte membrane.

In a fuel cell having such a cell structure, when ethanol ($C_2H_5OH$) as a pollutant in an atmospheric is introduced together with air as an oxidizer into the cathode, it contaminates the catalyst in the catalytic layer of the cathode to degrade catalytic activity. The ethanol diffuses from sources such as alcoholic drinks and cosmetics to an atmospheric.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
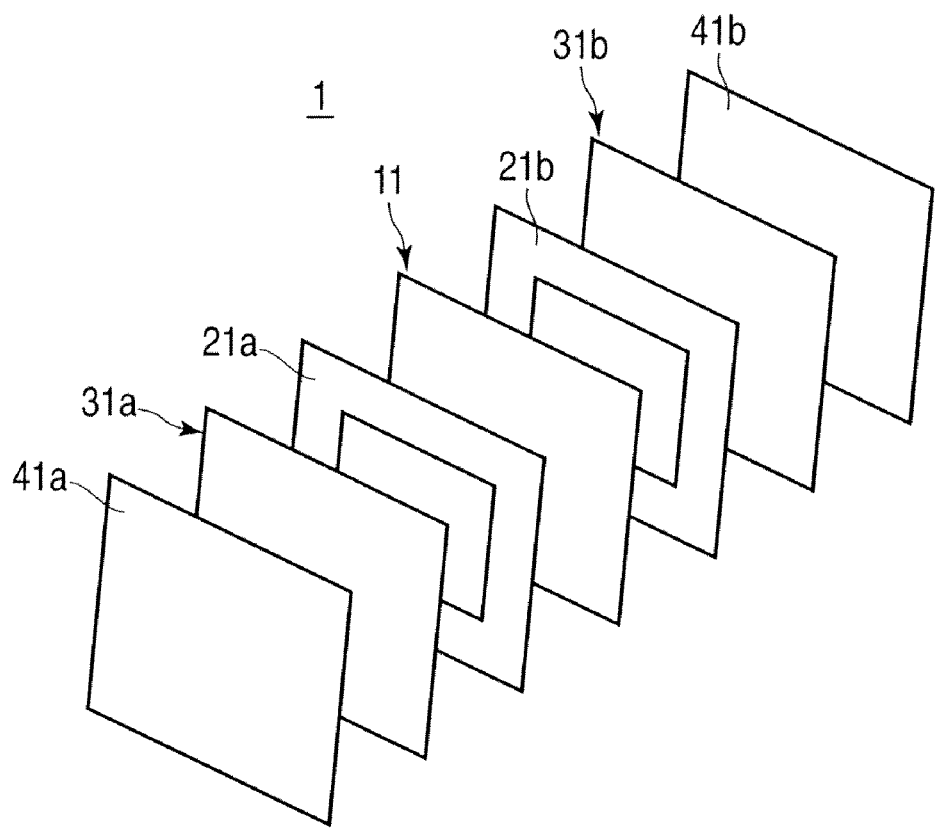
FIG. 1 is a schematically broken and perspective view showing a unit cell of a fuel cell according to an embodiment of the present invention.

In general, according to one embodiment, a direct-methanol fuel cell includes an anode which comprises a current collector and a first catalytic layer formed on the current collector and into which an aqueous methanol solution is introduced as a fuel, a cathode which comprises a current collector and a second catalytic layer formed on the current collector, the second catalytic layer being disposed facing the first catalytic layer and into which an oxidizer is introduced and an electrolyte membrane interposed between the anode and the cathode such that it is in contact with each catalytic layer, wherein at least the second catalytic layer comprises a catalyst, a perfluoroalkylsulfonic acid polymer, and a ternary metal-containing copolymer, the ternary metal-containing copolymer including a first vinyl monomer containing an organic metal complex of Pt, a second vinyl monomer containing an organic metal complex of M1, where M1 is a metal selected from Sn, Zn, Ni, Fe, Co, Al and Cu and a third vinyl monomer containing an organic metal complex in which M2 is ionically bonded, where M2 is Eu or La.

In each vinyl monomer of the ternary metal-containing copolymer, carbon is preferably bonded to the principal chain and an acidic functional group, a basic functional group and each of the above organic metal complexes are preferably bonded to this carbon.

The ternary metal-containing copolymer is preferably represented by the following formula (I).

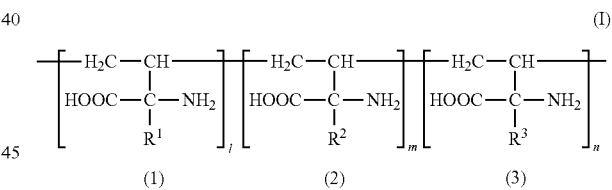

Where (1) to (3) represent the first, second and third vinyl monomers, respectively, $R^1$ is an organic metal complex which is represented by the following structural formula (A) and consists of an aliphatic hydrocarbon having a vinyl bond and platinum bonded to two vinyl-bonded carbons, $R^2$ is an organic metal complex which is represented by the following structural formula (B) and in which a metal M1 is bonded to a hetero aromatic ring, $R^3$ is an organic metal complex which is represented by the following structural formula (C) and in which a metal M2 is ionically bonded to acetic acid, and l, m and n denote the degrees of polymerization of the first, second and third vinyl monomers and are in the range of 100 to 300, 70 to 200 and 3 to 40, respectively.

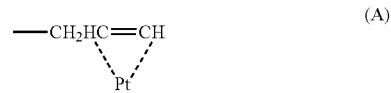

(B)

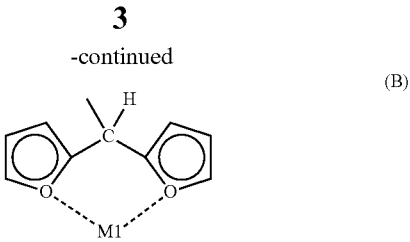

where M1 represents a metal selected from the group consisting of Sn, Zn, Ni, Fe and Co.

(C)

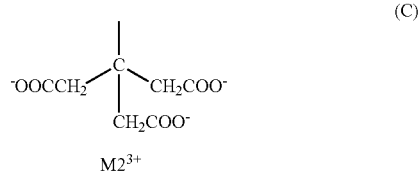

where M2 is a metal selected from Eu and La.

If the degree 1 of polymerization of the first vinyl monomer of the formula (I) is as low as less than 100, the ability to decompose ethanol decreases when ethanol as a pollutant in an atmospheric flows into the cathode. It therefore becomes difficult to efficiently prevent the catalyst in the second catalytic layer from being contaminated. The degree 1 of polymerization in the formula (I) is more preferably 140 to 250.

If the degree m of polymerization of the second vinyl monomer of the formula (I) is as low as less than 100, the ability to decompose ethanol decreases when ethanol as a pollutant in an atmospheric flows into the cathode. It therefore becomes difficult to efficiently prevent the catalyst in the second catalytic layer from being contaminated. If the degree m of polymerization exceeds 200, the dispersibility of a ternary metal-containing copolymer into a perfluoroalkylsulfonic acid polymer coexisting in the second catalytic layer decreases. As a result, the ability to decompose ethanol decreases, and it is likewise difficult to efficiently prevent the catalyst in the second catalytic layer from being contaminated. The degree m of polymerization in the formula (I) is more preferably 100 to 160.

If the degree n of polymerization of the third vinyl monomer represented by the formula (I) is as small as less than 3, the ability to decompose ethanol decreases when ethanol as a pollutant in an atmospheric flows into the cathode. It therefore becomes difficult to efficiently prevent the catalyst in the second catalytic layer from being contaminated. If the degree n of polymerization exceeds 40, the ternary metal-containing copolymers are coagulated in the second catalytic layer. As a result, the ability to decompose ethanol decreases, and it is likewise difficult to efficiently prevent the catalyst in the second catalytic layer from being contaminated. The degree n of polymerization in the formula (I) is more preferably 10 to 30.

The unit cell of a fuel cell according to an embodiment will be described in detail with reference to FIGS. 1 and 2. FIG. 1 is a schematically broken and perspective view showing a unit cell and FIG. 2 is a sectional view showing a membrane electrode incorporated into the unit cell of FIG. 1.

The unit cell 1 is provided with a membrane electrode 11 as shown in FIG. 1. A frame-like seal material 21a, a fuel passage plate 31a and a current collecting plate 41a are arranged in this order and stacked on one surface of the membrane electrode 11. A frame-like seal material 21b, an oxidizing gas passage plate 31b and a current collecting plate 41b are arranged in this order and laminated on the other surface of the membrane electrode 11.

Figure 2:
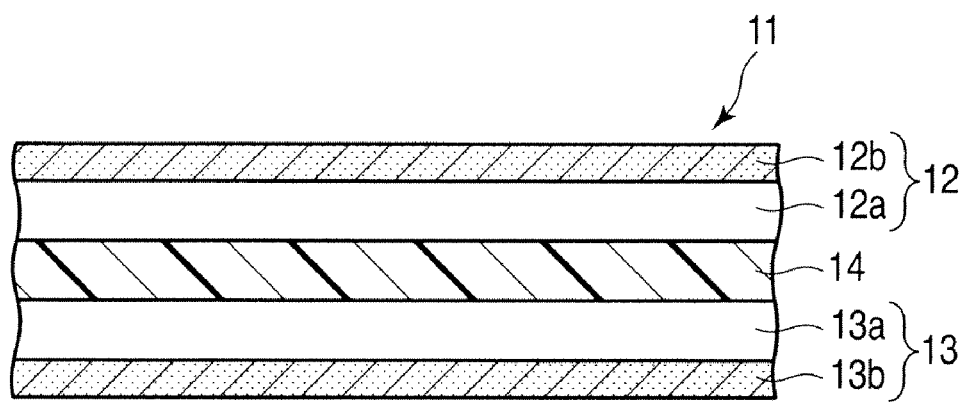
FIG. 2 is a sectional view showing a membrane electrode unit incorporated into the unit cell of FIG. 1.

As shown in FIG. 2, the membrane electrode 11 is provided with an anode 12 into which an aqueous methanol solution is introduced, a cathode 13 into which an oxidizing agent is introduced and an electrolyte membrane 14 interposed between the anode 12 and cathode 13. The anode 12 is constituted of a first catalytic layer 12a in contact with the electrolyte membrane 14 and a current collector (diffusion layer) 12b made of, for example, carbon paper laminated on the first catalytic layer 12a. The cathode 13 is constituted of a second catalytic layer 13a in contact with the electrolyte membrane 14 and a current collector (diffusion layer) 13b made of, for example, carbon paper laminated on the second catalytic layer 13a.

The second catalytic layer 13a of the cathode 13 is constituted of a catalyst, a perfluoroalkylsulfonic acid polymer and a ternary metal-containing copolymer. ternary metal-containing copolymer includes a first vinyl monomer containing an organic metal complex of Pt, a second vinyl monomer containing an organic metal complex of M1, where M1 is a metal selected from Sn, Zn, Ni, Fe, Co, Al and Cu and a third vinyl monomer containing an organic metal complex in which M2 is ionically bonded, where M2 is Eu or La. The ternary metal-containing copolymer is preferably represented by the above formula (I).

It should be noted that the first catalytic layer 12a of the anode 12 may have a structure similar to that of the second catalytic layer 13a of the cathode 13, that is, a structure constituted of a catalyst, a perfluoroalkylsulfonic acid polymer and a ternary metal-containing copolymer including a first vinyl monomer containing an organic metal complex of Pt, a second vinyl monomer containing an organic metal complex of M1, where M1 is a metal selected from Sn, Zn, Ni, Fe and Co and a third vinyl monomer containing an organic metal complex in which M2 is ionically bonded, where M2 is Eu or La. The ternary metal-containing copolymer is also preferably represented by the above formula (I).

As the catalyst, for example, a ruthenium platinate catalyst may be used in the case of the first catalytic layer and for example, platinum catalyst may be used in the case of the second catalytic layer.

As the perfluoroalkylsulfonic acid copolymer, for example, Nafion™ (manufactured by DuPont) may be used.

According to the embodiment described above, at least the second catalytic layer is constituted of a catalyst, a perfluoroalkylsulfonic acid polymer and a ternary metal-containing copolymer. The ternary metal-containing copolymer includes a first vinyl monomer containing an organic metal complex of Pt, a second vinyl monomer containing an organic metal complex of M1, where M1 is a metal selected from Sn, Zn, Ni, Fe and Co and a third vinyl monomer containing an organic metal complex in which M2 is ionically bonded, where M2 is Eu or La.

In a fuel cell including a cathode having such the second catalytic layer, ethanol as a pollutant in an atmospheric can be decomposed by the above ternary metal-containing copolymer even if ethanol flows into the fuel cell together with air as an oxidizer, when the fuel cell generates electricity. Therefore, the catalyst (for example, platinum) in the second catalytic layer can be prevented from being contaminated by ethanol and satisfactory catalytic activity can be maintained, thereby making it possible to attain an improvement in generated output.

In the ternary metal-containing copolymer represented by the formula (I), each vinyl monomer forms a helical structure in which carbon atoms are bonded to the principal chain and a carboxyl group, an amino group and an organic metal complex are bonded to these carbons. For this reason, the ability of incorporating ethanol is improved. As a result, the ability of decomposing ethanol is improved. Also, as shown by the ternary metal-containing copolymer represented by the formula (I), the ability of decomposing ethanol can be more improved by the action of the organic metal complex of M2 (where M2 is Eu or La) of the third vinyl monomer besides the actions of the organic metal complex of Pt of the first vinyl monomer and organic metal complex of M1 (where M1 is a metal selected from Sn, Zn, Ni, Fe, Co, Al and Cu) of the second vinyl monomer. As a result, ethanol as a pollutant in an atmospheric can be efficiently decomposed by the ternary metal-containing copolymer represented by the above formula (I) even if ethanol flows into the cathode together with air as an oxidizer, when the fuel cell generates electricity. Therefore, the catalyst (for example, platinum catalyst) in the second catalytic layer can be efficiently prevented from being contaminated by ethanol and satisfactory catalytic activity can be maintained, thereby making it possible to attain greater improvement in the generated output.

Moreover, if the first catalytic layer (a catalytic layer of the anode) is designed to have a structure containing a ternary metal-containing copolymer in the same manner as the second catalytic layer, the catalyst (for example, ruthenium platinate catalyst) in the first catalytic layer (a catalytic layer of the anode) can be efficiently prevented from being contaminated by ethanol flowing into the anode from the cathode and satisfactory catalytic activity can be maintained.

The present invention will be described in more detail by way of examples. In these examples, all designations of parts indicate parts by weight, unless otherwise noted.

SYNTHETIC EXAMPLE 1

A round bottomed reactor equipped with an overhead stirrer and a Dimroth condenser tube was charged with 300 parts of N,N-dimethylformamide and also charged with 100 parts of 3-(platinum-1-propylene)-3-amino-3-carboxy-1-propylene (first vinyl monomer (1) in the formula (I)), 70 parts of 3-difuraltinmethine-3-amino-3-carboxy-1-propylene (second vinyl monomer (2) in the formula (I)) and 3 parts of europium methyl-3-amino-3-carboxy-1-propylene 3-triacetate (third vinyl monomer (3) in the formula (I)), to dissolve the reaction solution. Then, 0.5 parts of azobisisobutyronitrile was further added to the reaction solution and then, the reaction solution was stirred for 2 hours while it was heated at 50° C. in an oil bath. After the reaction solution was stirred, it was taken out. Then, the reaction solution was added dropwise to 200 parts of acetone to precipitate the polymerized products, which were then isolated by centrifugation to synthesize a ternary metal-containing copolymer.

SYNTHETIC EXAMPLE 2

A ternary metal-containing copolymer was synthesized in the same method as in Synthetic Example 1 except that 140 parts of 3-(platinum-1-propylene)-3-amino-3-carboxy-1-propylene was used as the first vinyl monomer (1), 100 parts of 3-difuralzincmethine-3-amino-3-carboxy-1-propylene was used as the second vinyl monomer (2) and 10 parts of lanthanum methyl-3-amino-3-carboxy-1-propylene 3-triacetate was used as the third vinyl monomer (3).

SYNTHETIC EXAMPLE 3

A ternary metal-containing copolymer was synthesized in the same method as in Synthetic Example 1 except that 200 parts of 3-(platinum-1-propylene)-3-amino-3-carboxy-1-propylene was used as the first vinyl monomer (1), 130 parts of 3-difuralnickelmethine-3-amino-3-carboxy-1-propylene was used as the second vinyl monomer (2) and 20 parts of europium methyl-3-amino-3-carboxy-1-propylene 3-triacetate was used as the third vinyl monomer.

SYNTHETIC EXAMPLE 4

A ternary metal-containing copolymer was synthesized in the same method as in Synthetic Example 1 except that 250 parts of 3-(platinum-1-propylene)-3-amino-3-carboxy-1-propylene was used as the first vinyl monomer (1), 160 parts of 3 difuralironmethine-3-amino-3-carboxy-1-propylene was used as the second vinyl monomer (2) and 30 parts of lanthanum methyl-3-amino-3-carboxy-1-propylene 3-triacetate was used as the third vinyl monomer.

SYNTHETIC EXAMPLE 5

A ternary metal-containing copolymer was synthesized in the same method as in Synthetic Example 1 except that 300 parts of 3-(platinum-1-propylene)-3-amino-3-carboxy-1-propylene was used as the first vinyl monomer (1), 200 parts of 3-difuralcobaltmethine-3-amino-3-carboxy-1-propylene was used as the second vinyl monomer (2) and 40 parts of lanthanum methyl-3-amino-3-carboxy-1-propylene 3-triacetate was used as the third vinyl monomer.

The proportions of the first vinyl monomer (1), second vinyl monomer (2) and third vinyl monomer (3) in Synthetic Examples 1 to 5 are shown in Table 1.

TABLE 1

| | | | | Ternary Metal-containing Copolymer | | | | |
|---|---|---|---|---|---|---|---|---|
| | | First vinyl monomer (1) | | | Second vinyl monomer (2) | | Third vinyl monomer (3) | |
| | | Monomers | | l | Monomers | m | Monomers | n |
| Synthetic Example 1 | | 3-(platinum-1-propylene)-3-amino-3-carboxy-1-propylene | | 100 | 3-difuraltinmethine-3-amino-3-carboxy-1-propylene | 70 | Europium methyl-3-amino-3-carboxy-1-propylene 3-triacetate | 3 |
| Synthetic Example 2 | | 3-(platinum-1-propylene)-3-amino-3-carboxy-1-propylene | | 140 | 3-difuralzincmethine-3-amino-3-carboxy-1-propylene | 100 | Lanthanum methyl-3-amino-3-carboxy-1-propylene 3-triacetate | 10 |
| Synthetic Example 3 | | 3-(platinum-1-propylene)-3-amino-3-carboxy-1-propylene | | 200 | 3-difuralnickelmethine-3-amino-3-carboxy-1-propylene | 130 | Europium methyl-3-amino-3-carboxy-1-propylene 3-triacetate | 20 |
| Synthetic Example 4 | | 3-(platinum-1-propylene)-3-amino-3-carboxy-1-propylene | | 250 | 3-difuralironmethine-3-amino-3-carboxy-1-propylene | 160 | Lanthanum methyl-3-amino-3-carboxy-1-propylene 3-triacetate | 30 |
| Synthetic Example 5 | | 3-(platinum-1-propylene)-3-amino-3-carboxy-1-propylene | | 300 | 3-difuralcobaltmethine-3-amino-3-carboxy-1-propylene | 200 | Europium methyl-3-amino-3-carboxy-1-propylene 3-triacetate | 40 |

(Measurement of Circular Dichroitic Spectrum)

To prepare test solutions, 0.1 parts of the obtained ternary metal-containing copolymer of each of Synthetic Examples 1 to 5 was dissolved in 10 parts of N,N-dimethylformamide. Then, 3 mL of each of the test solutions was poured into a quartz glass cell (internal dimensions: 10 mm×10 mm×35 mm) by a 3 mL pipette. The test solution in the quartz glass cell was analyzed by means of a fluorescence spectrophotometer (FluoroMax-4, manufactured by Horiba Ltd.) to measure the circular dichroitic spectrum of the test solution. In this case, the cell was slowly shaken to mix before the measurement of fluorescence and then secured to the cell fixing pocket of the fluorescence spectrophotometer. The results of measurement are shown in FIG. 3.

Figure 3:
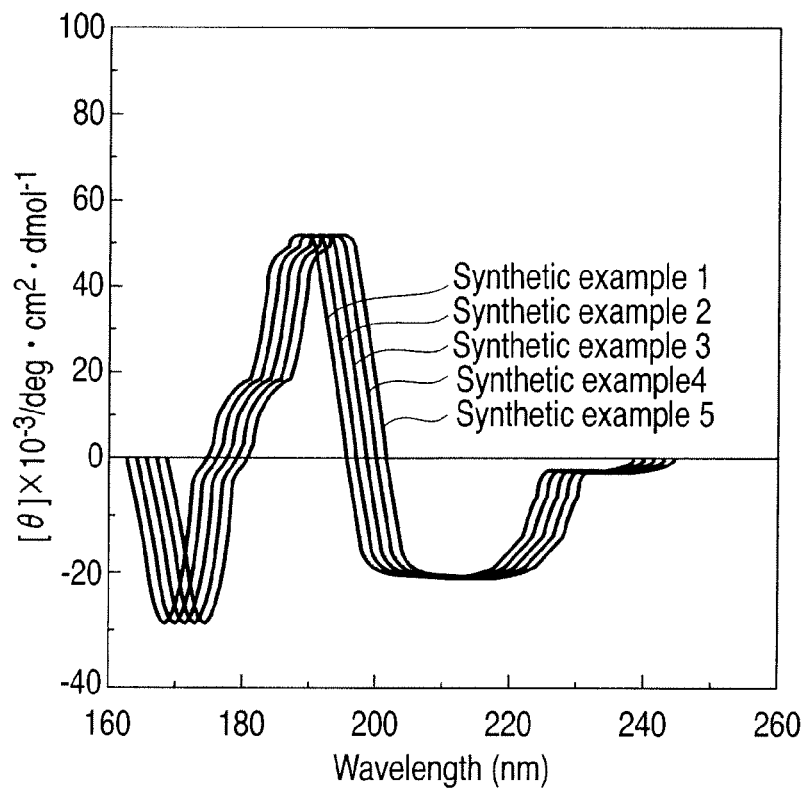
FIG. 3 is a view showing the results of the circular dichroitic spectrum of a ternary metal-containing copolymer obtained in each of Synthetic Examples 1 to 5.

In all of the ternary metal-containing copolymers of Synthetic Examples 1 to 5, as shown in FIG. 3, the positive Cotton effect was found at around 188 nm and an absorption spectrum showing an α-helix structure was exhibited. In other words, it has been clarified that any of the ternary metal-containing copolymers has an α-helix structure.

The results of identification of each ternary metal-containing copolymer obtained in Synthetic Examples 1 to 5 are shown in the following Table 2.

TABLE 2

| | $^1$H-NMR (ppm) | $^{13}$C-NMR (ppm) | IR (cm$^{-1}$) |
|---|---|---|---|
| Synthetic Example 1 | 1.8, 2.2, 2.4, 4.6, 5.2, 5.8, 7.8, 8.2, 11.2 | 40, 43, 46, 52, 76, 133, 145, 148, 195, 185, 199 | 689, 723, 948, 1020, 1116, 1523, 2150, 2943, 3208, 3305 |
| Synthetic Example 2 | 1.9, 2.3, 2.6, 4.8, 5.4, 5.6, 7.5, 8.23, 11.8 | 42, 44, 48, 54, 78, 135, 142, 146, 198, 186, 204 | 678, 717, 952, 1032, 1123, 1543, 2189, 2952, 3214, 3345 |
| Synthetic Example 3 | 1.8, 2.2, 2.4, 4.6, 5.2, 5.9, 7.6, 8.6, 11.4 | 41, 43, 46, 52, 76, 133, 145, 148, 195, 189, 200 | 689, 723, 948, 1020, 1116, 1523, 2150, 2943, 3208, 3305 |
| Synthetic Example 4 | 1.9, 2.3, 2.6, 4.8, 5.4, 6.2, 8.1, 8.6, 12.1 | 41, 43, 46, 52, 74, 135, 144, 152, 196, 190, 203 | 676, 715, 932, 1031, 1147, 1518, 2143, 2933, 3212, 3335 |
| Synthetic Example 5 | 1.8, 2.2, 2.4, 4.6, 5.2, 5.8, 7.8, 8.2, 11.6 | 41, 43, 47, 54, 78, 137, 146, 149, 197, 188, 202 | 676, 719, 934, 1023, 1124, 1523, 2148, 2945, 3218, 3324 |

EXAMPLE 1

(Production of an Anode)

Twenty parts of a ruthenium platinate-carrying carbon powder and 3 parts of the ternary metal-containing copolymer obtained in Synthetic Example 1 were dispersed in 80 parts of a 5% perfluoroalkylsulfonic acid polymer (Nafion™, manufactured by DuPont) solution to prepare slurry. The obtained slurry was applied to the surface of carbon paper (TPG-H-120, manufactured by Toray Industries, Inc.) by using a coater such that the amount of ruthenium platinate to be carried was 2 mg/cm$^2$ to form a first catalytic layer on the carbon paper, thereby producing an anode.

(Production of a Cathode)

Twenty parts of a platinum-carrying carbon powder and 3 parts of the ternary metal-containing copolymer obtained in Synthetic Example 1 were dispersed in 80 parts of a 5% perfluoroalkylsulfonic acid polymer (Nafion™, manufactured by DuPont) solution to prepare slurry. The obtained slurry was applied to the surface of carbon paper (TPG-H-120, manufactured by Toray Industries, Inc.) by using a coater such that the amount of platinum to be carried was 1 mg/cm$^2$ to form a second catalytic layer on the carbon paper, thereby producing a cathode.

(Production of a Membrane Electrode)

The obtained anode and cathode were arranged such that the first and the second catalytic layers were disposed opposite to each other and a polymer electrolyte membrane (Nafion™ 117, manufactured by DuPont) was arranged between these electrodes. Then, the obtained laminate was subjected to a hot-press to manufacture a membrane electrode having an electrode area of 5 cm$^2$.

(Fabrication of a Unit Cell)

The obtained membrane electrode was sandwiched between two carbon separators each provided with a column flow passage and between two current collectors, followed by fastening the stacked body with a bolt to produce an evaluation unit cell.

EXAMPLE 2

The productions of the anode and cathode, production of the membrane electrode and fabrication of the evaluation unit cell were carried out in the same manner as in Example 1 except that the ternary metal-containing copolymer obtained in Synthetic Example 2 was used in place of the ternary metal-containing copolymer obtained in Synthetic Example 1.

EXAMPLE 3

The productions of the anode and cathode, production of the membrane electrode and fabrication of the evaluation unit cell were carried out in the same manner as in Example 1 except that the ternary metal-containing copolymer obtained in Synthetic Example 3 was used in place of the ternary metal-containing copolymer obtained in Synthetic Example 1.

EXAMPLE 4

The productions of the anode and cathode, production of the membrane electrode and fabrication of the evaluation unit cell were carried out in the same manner as in Example 1 except that the ternary metal-containing copolymer obtained in Synthetic Example 4 was used in place of the ternary metal-containing copolymer obtained in Synthetic Example 1.

EXAMPLE 5

The productions of the anode and cathode, production of the membrane electrode and fabrication of the evaluation unit cell were carried out in the same manner as in Example 1 except that the ternary metal-containing copolymer obtained in Synthetic Example 5 was used in place of the ternary metal-containing copolymer obtained in Synthetic Example 1.

COMPARATIVE EXAMPLE 1

(Production of an Anode)

Twenty parts of a ruthenium platinate-carrying carbon powder was dispersed in 80 parts of a 5% perfluoroalkylsulfonic acid polymer (Nafion™, manufactured by DuPont) solution to prepare slurry. The obtained slurry does not contain any ternary metal-containing copolymer. Subsequently, this slurry was applied to the surface of carbon paper (TPG-H-120, manufactured by Toray Industries, Inc.) by using a coater such that the amount of ruthenium platinate to be carried was 2 mg/cm$^2$ to form a first catalytic layer on the carbon paper, thereby producing an anode.

(Production of a Cathode)

Twenty parts of a platinum-carrying carbon powder was dispersed in 80 parts of a 5% perfluoroalkylsulfonic acid polymer (Nafion™, manufactured by DuPont) solution to prepare slurry. The obtained slurry does not contain any ternary metal-containing copolymer. Subsequently, this slurry was applied to the surface of carbon paper (TPG-H-120, manufactured by Toray Industries, Inc.) by using a coater such that the amount of platinum to be carried was 1 mg/cm$^2$ to form a second catalytic layer on the carbon paper, thereby producing a cathode.

Using the obtained anode and cathode, a membrane electrode was manufactured and an evaluation unit cell was fabricated in the same method as in Example 1.

<Evaluation of a Unit Cell>

Each unit cell obtained in Examples 1 to 5 and Comparative Example 1 was subjected to an evaluation test in which a 3-wt % aqueous methanol solution (fuel) was fed to the anode side of the unit cell at a rate of 5 mL/min and air was fed to the cathode side of the unit cell at a rate of 10 mL/min. The air was fed such that 20 ppm of an ethanol volatile component always existed. The current-voltage characteristic of each unit cell was measured at 50° C. The results are shown in FIG. 4.

Figure 4:
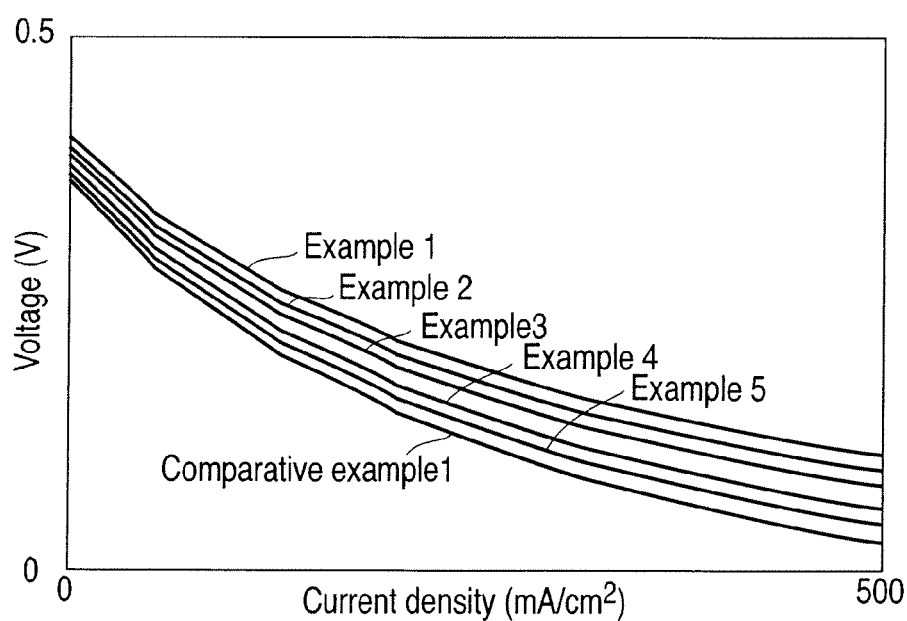
FIG. 4 is a view showing a current-voltage characteristic curve of an evaluation unit cell obtained in each of Examples 1 to 5 and Comparative Example 1.

As is clear from FIG. 4, it is found that the unit cells of Examples 1 to 5 can output a higher voltage than the unit cell of Comparative Example 1 when using air, as the oxidizer, in which 20 ppm of an ethanol volatile component always exists.

Also, each unit cell obtained in Examples 1 to 5 and Comparative Example 1 was subjected to an evaluation test in which a 3-wt % aqueous methanol solution (fuel) was fed to the anode side of the unit cell at a rate of 5 mL/min and air was fed to the cathode side of the unit cell at a rate of 10 mL/min. The air was fed such that 20 ppm of an ethanol volatile component always existed. The fuel cell was operated at 50° C. for 2000 hours while keeping a constant current density of 100 mA/cm$^2$ to observe a variation in potential. The results are shown in FIG. 5.

Figure 5:
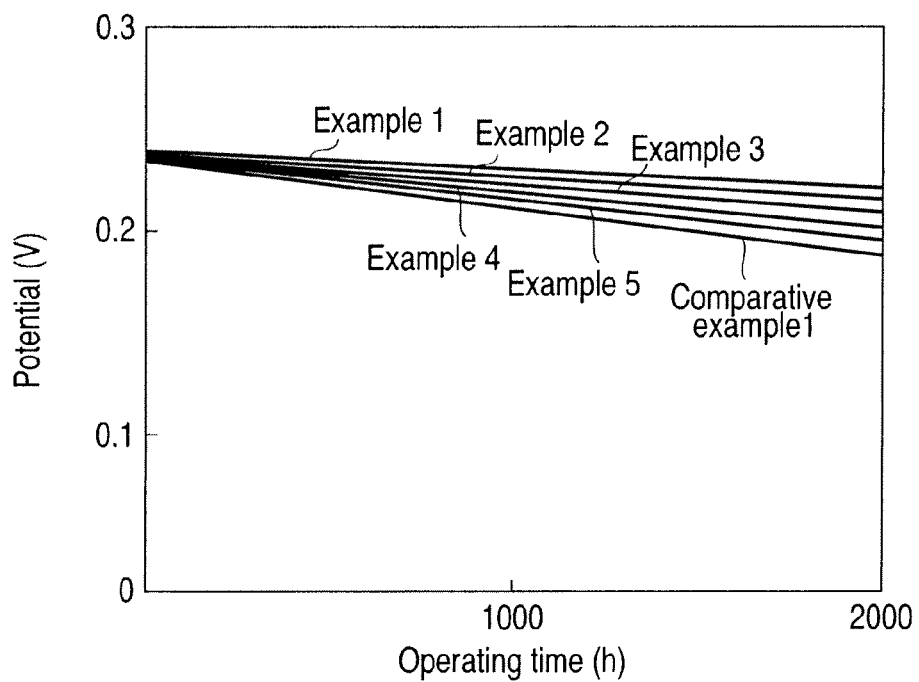
FIG. 5 is a view showing a variation in the voltage of an evaluation unit cell when each battery obtained in Examples 1 to 5 and Comparative Example 1 is operated for an extended period with the current density kept constant.

As is clear from FIG. 5, it is understood that each unit cell obtained in Examples 1 to 5 has higher potential retention than the unit cell of Comparative Example 1 even after a long-term operation, enabling highly reliable power generation.

EXAMPLE 6

In Example 2, the degree m of polymerization of the second vinyl monomer (2) was set to 100 and the degree n of polymerization of the third vinyl monomer (3) was set to 10, while the degree 1 of polymerization of the first vinyl monomer (1) was varied between 20 and 330 in the formula (I), to measure the potential of the fuel cell at a current density of 100 mW/cm$^2$. The results are shown in FIG. 6.

Figure 6:
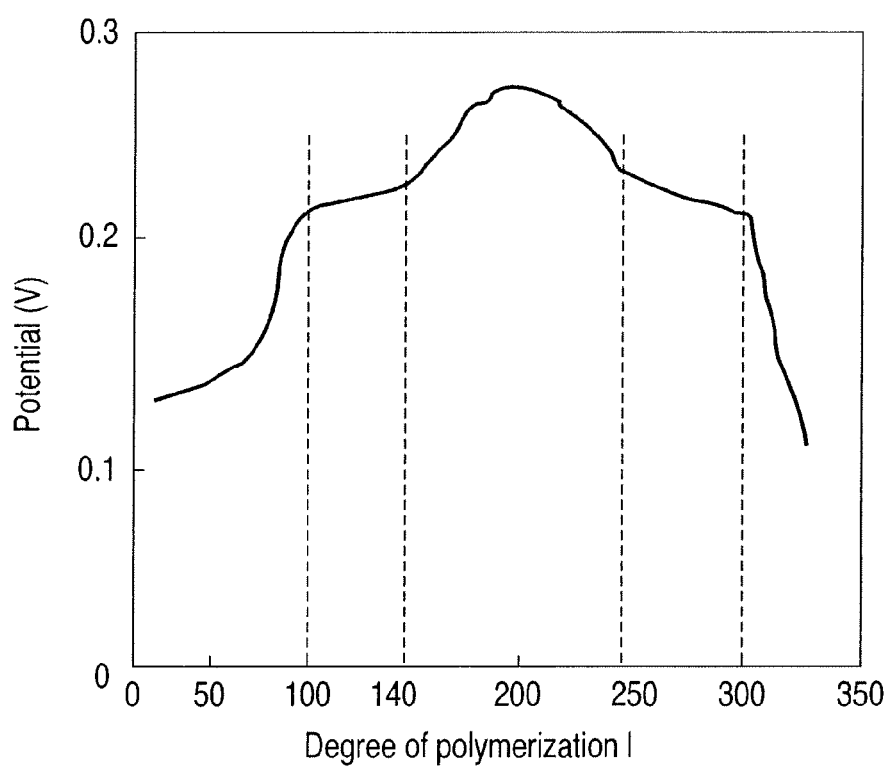
FIG. 6 is a view showing a variation in the voltage of an evaluation unit when the degree l of polymerization of the first vinyl monomer of a ternary metal-containing copolymer represented by a formula (I) is changed.

As is clarified from FIG. 6, it is understood that a high potential is observed when the degree 1 of polymerization of the first vinyl monomer (1) is in the range of 100 to 300.

EXAMPLE 7

In Example 2, the degree 1 of polymerization of the first vinyl monomer (1) was set to 140 and the degree n of polymerization of the third vinyl monomer (3) was set to 10, while the degree m of polymerization of the second vinyl monomer (2) was varied between 70 and 200 in the formula (I), to measure the potential of the fuel cell at a current density of 100 mW/cm$^2$. The results are shown in FIG. 7.

Figure 7:
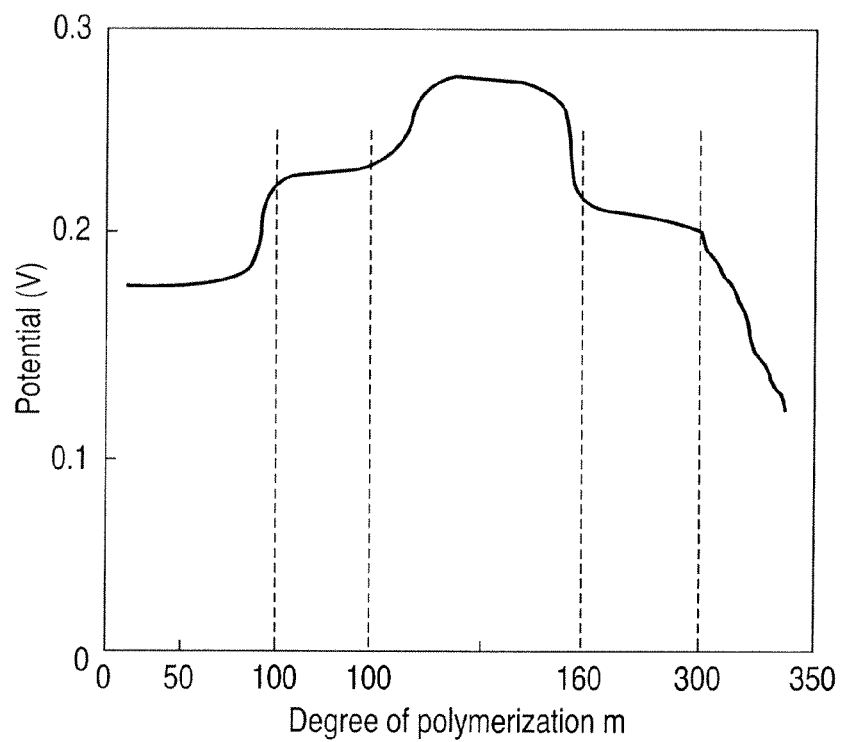
FIG. 7 is a view showing a variation in the voltage of an evaluation unit when the degree m of polymerization of the second vinyl monomer of a ternary metal-containing copolymer represented by a formula (I) is changed.

As is clarified from FIG. 7, it is understood that a high potential is observed when the degree m of polymerization of the second vinyl monomer is in the range of 70 to 200.

EXAMPLE 8

In Example 1, the degree 1 of polymerization of the first vinyl monomer (1) was set to 140 and the degree m of polymerization of the second vinyl monomer (2) was set to 100, while the degree n of polymerization of the third vinyl monomer (3) was varied between 3 to 40 in the formula (I), to measure the potential of the fuel cell at a current density of 100 mW/cm$^2$. The results are shown in FIG. 8.

Figure 8:
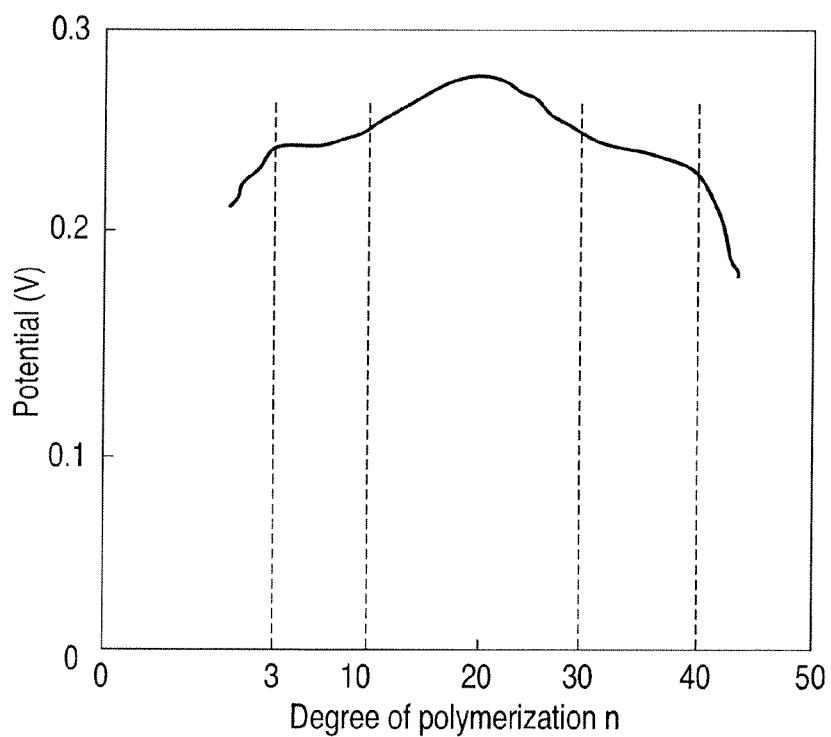
FIG. 8 is a view showing a variation in the voltage of an evaluation unit when the degree n of polymerization of the third vinyl monomer of a ternary metal-containing copolymer represented by a formula (I) is changed.

As is clarified from FIG. 8, it is understood that a high potential is observed when the degree n of polymerization of the third vinyl monomer is in the range of 3 to 40.

While certain embodiments of the invention have been described, these embodiments have been presented by way of example only, and are not intended to limit the scope of the invention. Indeed, the novel methods and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A direct-methanol fuel cell comprising:

an anode which comprises a current collector and an anode catalytic layer formed in the current collector and into which an aqueous methanol solution is introduced as a fuel;

a cathode which comprises a current collector and a cathode catalytic layer formed in the current collector, the cathode catalytic layer being disposed facing the anode catalytic layer and into which an oxidizer is introduced; and an electrolyte membrane interposed between the anode and the cathode such that it is in contact with each catalytic layer, wherein the cathode catalytic layer comprises a catalyst, a perfluoroalkylsulfonic acid polymer, and a ternary metal-containing copolymer including a first, a second and a third vinyl monomers, the first vinyl monomer containing a carbon atom bonded to a vinyl group, and an acidic functional group, a basic functional group and an organic metal complex of Pt, the acidic functional group, the basic functional group and a carbon atom in the organic metal complex of Pt being bonded to the carbon atom, respectively, the second vinyl monomer containing a carbon atom bonded to a vinyl group, and an acidic functional group, a basic functional group and an organic metal complex of M1, where M1 is a metal selected from Sn, Zn, Ni, Fe, Co, Al and Cu, the acidic functional group, the basic functional group and a carbon atom in the organic metal complex of M1 being bonded to the carbon atom, respectively, and the third vinyl monomer containing a carbon atom bonded to a vinyl group, and an acidic functional group, a basic functional group and an organic metal complex in which M2 is ionically bonded, where M2 is Eu or La, the acidic functional group, the basic functional group and a carbon atom in the organic metal complex being bonded to the carbon atom, respectively.

2. The fuel cell of claim 1, wherein the catalyst in the cathode catalytic layer is platinum.

* * * * *